United States Patent
Liang

(10) Patent No.: US 7,988,417 B1
(45) Date of Patent: Aug. 2, 2011

(54) AIR COOLED TURBINE BLADE

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 925 days.

(21) Appl. No.: 11/986,032

(22) Filed: Nov. 19, 2007

(51) Int. Cl.
*F01D 5/08* (2006.01)

(52) U.S. Cl. .......... 416/90 R; 416/96 R; 416/97 R; 415/115

(58) Field of Classification Search .......... 416/90 R, 416/96 R, 97 R; 415/115
See application file for complete search history.

(56) References Cited

U.S. PATENT DOCUMENTS

| | | | | |
|---|---|---|---|---|
| 5,975,850 A * | 11/1999 | Abuaf et al. | ........ | 416/97 R |
| 6,164,914 A * | 12/2000 | Correia et al. | ........ | 416/97 R |
| 6,491,496 B2 * | 12/2002 | Starkweather | ........ | 416/97 R |
| 6,672,836 B2 * | 1/2004 | Merry | ........ | 416/97 R |
| 6,988,872 B2 * | 1/2006 | Soechting et al. | ........ | 416/96 R |
| 7,137,780 B2 * | 11/2006 | Liang | ........ | 416/90 R |

* cited by examiner

*Primary Examiner* — Igor Kershteyn
(74) *Attorney, Agent, or Firm* — John Ryznic

(57) ABSTRACT

A turbine blade with a 5-pass serpentine flow cooling circuit for mid-blade cooling that is formed from a 3-pass forward flowing serpentine circuit followed by a 2-pass aft flowing serpentine circuit with the first leg or supply channel for the circuit located between the second leg and the fourth leg. A crossover channel connects the third leg to the fourth leg and passes underneath the blade tip to provide convective cooling and also discharges cooling air through tip cooling holes.

17 Claims, 4 Drawing Sheets

Typical 1st Blade External Pressure Profile

AIR COOLED TURBINE BLADE

BACKGROUND OF THE INVENTION

1. Field of the Invention

The present invention relates generally to a gas turbine engine, and more specifically to an air cooled turbine blade.

2. Description of the Related Art Including Information Disclosed Under 37 CFR 1.97 and 1.98

In a gas turbine engine, such as an aero engine used to power an aircraft or an industrial gas turbine engine used to produce electrical power, a turbine section includes a plurality of stages of rotor blades and stator vanes to extract the energy from the hot gas flow passing through. The engine efficiency can be improved by increasing the temperature of the hot gas flow entering the turbine. However, the inlet temperature is limited to the material properties of the first stage vanes and rotor blades. To improve the efficiency, complex internal cooling circuits have also been proposed to provide impingement and film cooling to these airfoils in order to allow for a higher gas flow temperature.

FIG. 1 shows a pressure profile for a first stage turbine blade in a prior art industrial gas turbine engine. FIG. 1 shows a graph of the pressure profile on the pressure side and on the suction side of the blade. The forward region of the pressure side surface experiences high hot gas static pressure while the entire suction side of the airfoil is at a much lower hot gas static pressure. Thus, a higher pressure of cooling air is required on the pressure side than on the suction side if film cooling holes are used.

FIG. 2 shows a prior art turbine blade with a (1+5+1) serpentine flow cooling design for the first stage blade. The flow path for the 5-pass serpentine flow circuit is shown in FIG. 3. A leading edge supply channel 11 delivers cooling air to the leading edge region with a showerhead arrangement 15, a trailing edge cooling supply channel 12 delivers cooling air to exit cooling holes 16, and a supply channel or first leg 13 of the 5-pass serpentine flow circuit is positioned between the leading edge and the trailing edge channels 11 and 12 and flows forward toward the leading edge region. For a forward flowing 5-pass serpentine flow cooling circuit design used in the airfoil mid-chord region, the cooling air flows in the forward direction toward and discharges into the high hot gas side pressure section of the pressure side and the suction side through film cooling holes 17 in the $5^{th}$ or last leg. In order to satisfy the back flow margin criteria (cooling air pressure for film cooling holes is higher than the external static hot gas pressure so that the hot gas does not flow into the cooling holes), a high cooling supply pressure is needed for this particular design, which induces a high leakage flow. Since the pressure of the cooling air in the 5-pass serpentine circuit decreases as it passes through the circuit toward the leading edge region, the cooling air pressure in the last or $5^{th}$ leg is at its lowest. As seen from the graph in FIG. 1, the external hot gas static pressure at the last leg is higher than at any of the other legs in this serpentine circuit. Thus, the inlet pressure of the cooling air entering the first leg must be high enough so that the pressure in the last leg is high enough to prevent the hot gas flow in the last leg from entering the cooling holes.

BRIEF SUMMARY OF THE INVENTION

It is an object of the present invention to provide for an air cooled turbine blade with a 5-pass serpentine flow cooling circuit that requires a lower cooling air supply pressure than the prior art 5-pass serpentine flow circuit.

It is another object of the present invention to provide for a serpentine flow cooling circuit that can be used to cool a mid-chord region of a turbine blade.

DETAILED DESCRIPTION OF THE INVENTION

Figure 4:
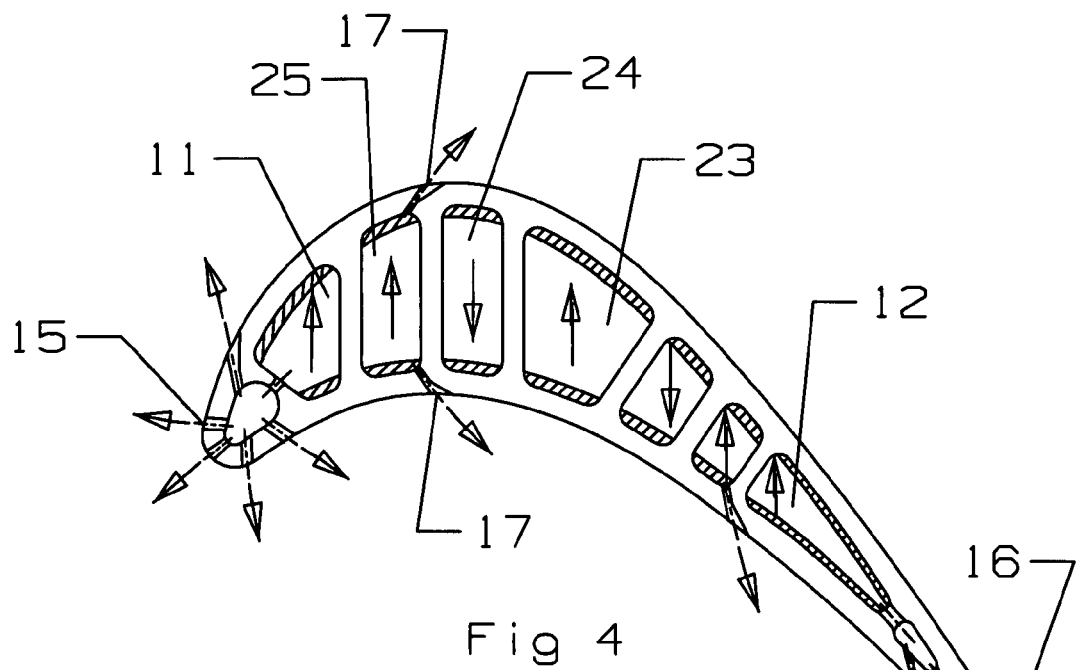
FIG. 4 shows a cross section top view of the serpentine flow cooling circuit of the present invention.
Figure 5:
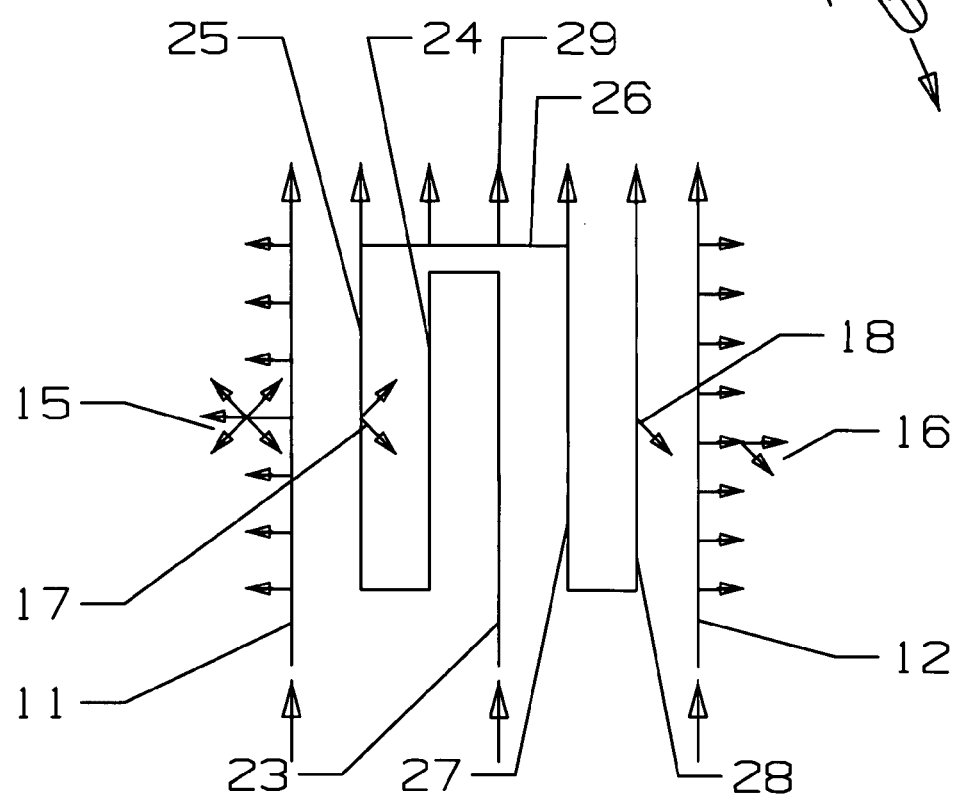
FIG. 5 shows a diagram of the cooling flow for the serpentine cooling circuit of the present invention.

The first stage turbine blade of the present invention is shown in FIG. 4 as a cross section top view with a leading edge cooling supply channel connected through a metering and impingement hole to a leading edge impingement cavity having a showerhead arrangement of film cooling holes 15 to discharge cooling air onto the leading edge of the airfoil. the trailing edge cooling supply channel 12 supplies cooling air to the trailing edge exit slots or holes 16 positioned along the trailing edge of the airfoil after passing through a series of metering and impingement holes and cavities. The 5-pass serpentine flow cooling circuit of the present invention is positioned between the leading edge channel 11 and the trailing edge supply channel 12 and is best seen in FIG. 5.

The 5-pass serpentine circuit of the present invention includes a first leg 23 to supply cooling air, a second leg 24 located forward and downstream from the first leg 23, a third leg 25 located forward of the second leg 24 and adjacent to the leading edge region, a crossover channel 26 passing from the third leg 25 to a fourth leg 27, the crossover channel passing under the blade tip, and a fifth leg 28 located adjacent to the trailing edge cooling supply channel 12. The third leg 25 includes film cooling holes to discharge film cooling air onto both the pressure side and the suction side walls of the airfoil. The fifth leg 28 includes film cooling holes on the pressure side of the airfoil. The crossover channel 26 includes tip cooling holes 29 to provide cooling air for the blade tip. The tip cooling holes 29 can be film cooling holes on the pressure side or suction side peripheral, or they can be core printout holes that are used during the casting process for the blade.

Figure 1:
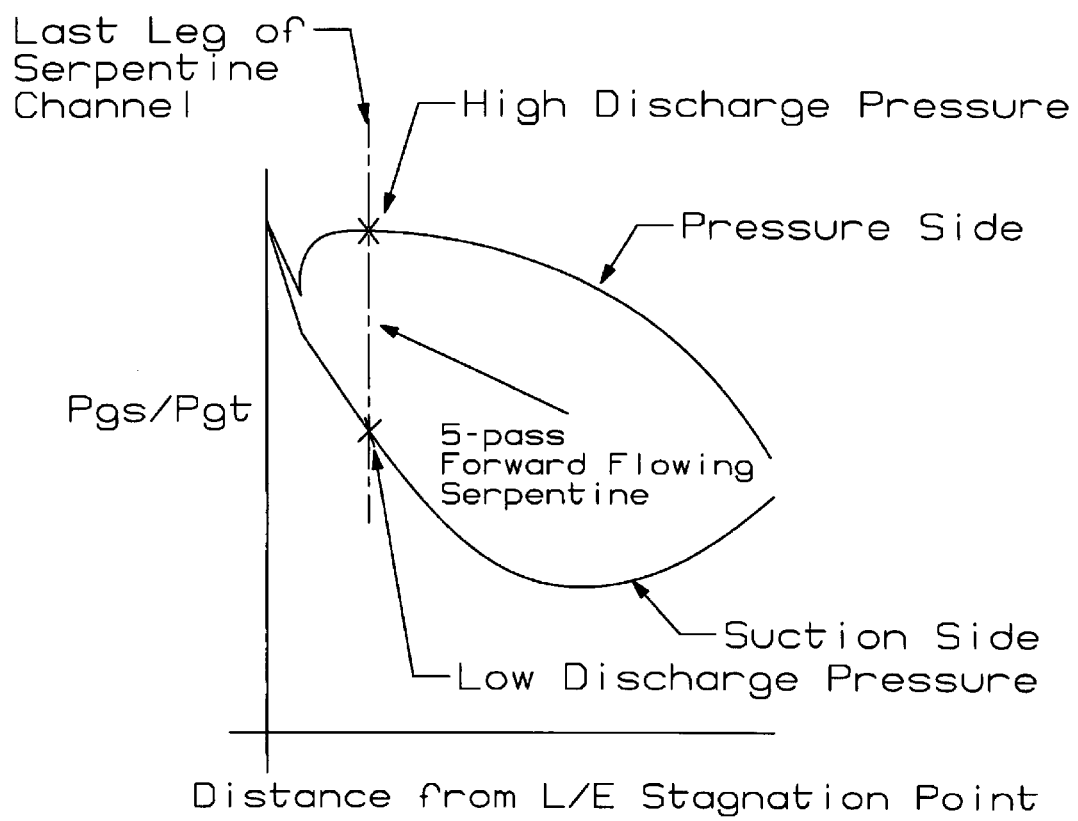
FIG. 1 shows a graph of a first stage turbine blade external pressure profile.
Figure 2:
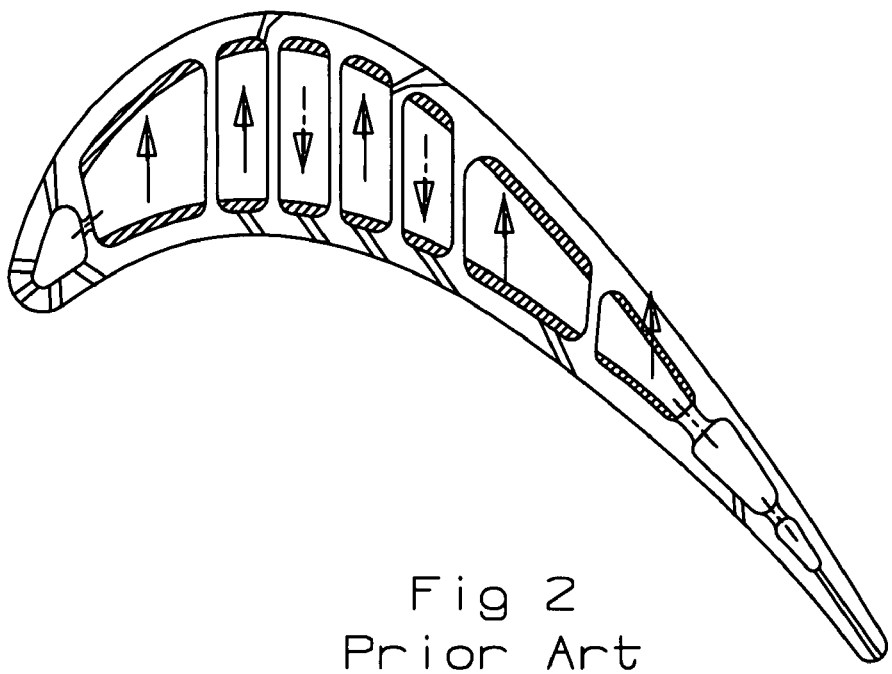
FIG. 2 shows a cross section top view of a prior art first stage turbine blade internal cooling circuit.
Figure 3:
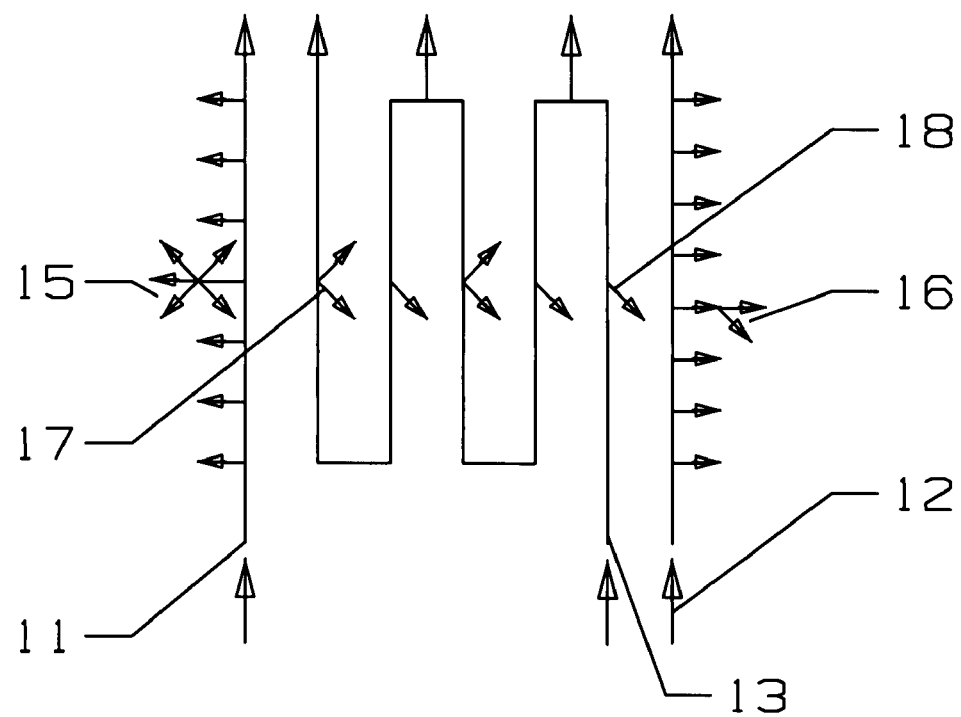
FIG. 3 shows a diagram of the cooling air flow for the prior art first stage turbine blade serpentine flow cooling circuit of FIG. 2.
Figure 6:
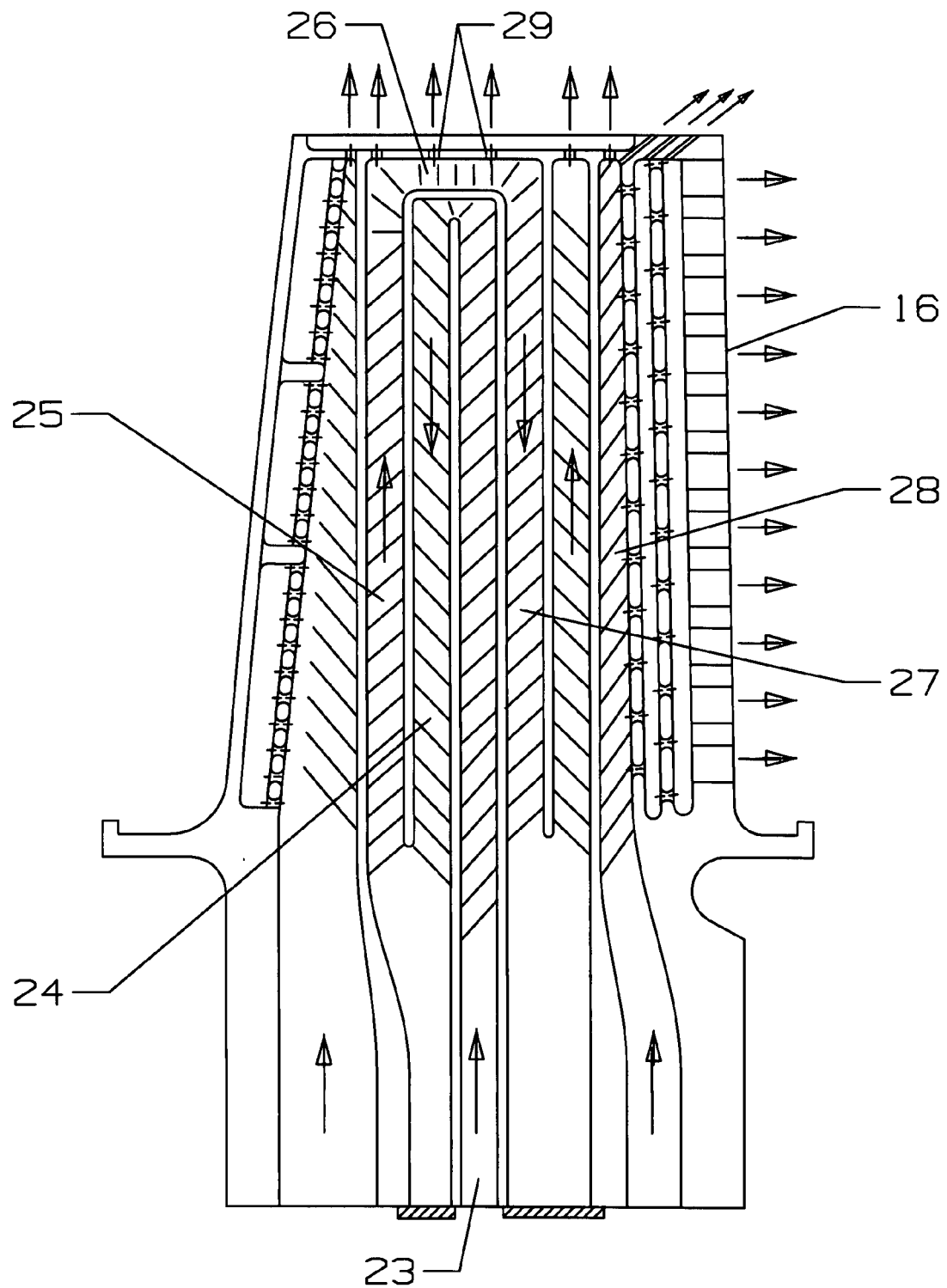
FIG. 6 shows a cross section side view for the serpentine flow cooling circuit of the present invention.

FIG. 6 shows a cross section side view of the blade with the cooling circuit of the present invention. The unique feature of the 5-pass serpentine flow cooling circuit of the present invention is a forward flowing triple pass (3-pass) serpentine circuit in series with an aft flowing double pass (2-pass) serpentine circuit for the blade mid-chord region. The 5-pass serpentine flow cooling circuit is fed through the blade middle section in the first leg 23. The prior art 5-pass serpentine circuit of FIG. 3 is fed through the blade aft section and then flows forward for the forward flowing serpentine design. The 5-pass serpentine circuit of the present invention is fed through the blade main body section. since the cooling air temperature is fresh and the blade mid-chord section contains more metal than both ends of the airfoil, the cooling air feed system maximizes the use of cooling air potential to achieve a low mass average temperature and yields a higher stress rupture life for the blade.

The first portion of the 5-pass serpentine cooling flow circuit includes a triple pass forward flowing serpentine cooling flow circuit which provides cooling for the forward section of the airfoil. A portion of the cooling air is discharged as film cooling air for the pressure and suction sides of the airfoil at the third leg of the serpentine flow circuit. The forward flowing serpentine cooling flow circuit used for the airfoil forward section will maximize the use of cooling air pressure potential. Since the cooling air is discharged onto the airfoil pressure side forward region where the main stream hot gas side pressure is still rather high, the forward flowing triple pass serpentine circuit will consume less pressure then the forward flowing 5-pass serpentine flow circuit of the prior art. Thus, a lower cooling air pressure supply is needed for the serpentine cooling circuit of the present invention. Also, the cooling air flows forward and picks up heat and then discharges the cooling air to the external surfaces as film cooling air. The counter flow cooling circuit will maximize the use of cooling air and provide a very high overall cooling efficiency for the airfoil forward section surface than would the prior art circuit of FIG. 3.

At the end of the forward flowing triple pass serpentine cooling flow channel is a double pass aft flowing serpentine to provide the cooling for the aft portion of the blade mid-chord section. The aft flowing serpentine cooling flow circuit used for the airfoil aft section surface will maximize the use of cooling air to the main stream gas side pressure potential. The spent cooling air is discharged at the aft section of the airfoil where the gas side pressure is the lowest and therefore yields a high cooling air to main stream pressure potential to be used for the serpentine channels and maximize the internal cooling supply pressure requirement and lower the leakage flow.

I claim the following:

1. A turbine blade for a gas turbine engine comprising:
an airfoil having a leading edge and a trailing edge, and a pressure side wall and a suction side wall; and,
a 5-pass serpentine flow cooling circuit which includes a 3-pass forward flowing serpentine circuit and a 2-pass aft flowing serpentine circuit downstream from the 3-pass serpentine circuit, and the five legs of the serpentine flow cooling circuit being connected in series.

2. The turbine blade of claim 1, and further comprising:
the first leg of the 5-pass serpentine circuit is positioned between the second leg and the fourth leg.

3. The turbine blade of claim 1, and further comprising:
a crossover channel joins the third leg to the fourth leg.

4. The turbine blade of claim 3, and further comprising:
the crossover channel passes underneath the blade tip.

5. The turbine blade of claim 4, and further comprising:
the crossover channel includes a plurality of tip cooling holes to discharge cooling air through the blade tip.

6. The turbine blade of claim 1, and further comprising:
the third leg includes a plurality of film cooling holes to discharge film cooling air onto the pressure side wall or the suction side wall.

7. The turbine blade of claim 1, and further comprising:
the 5-pass serpentine circuit extends substantially along the entire spanwise length of the airfoil from the platform to the tip.

8. The turbine blade of claim 1, and further comprising:
a leading edge cooling supply channel positioned in the leading edge region of the airfoil;
an impingement cavity connected to the leading edge supply channel; and,
a showerhead arrangement of film cooling holes connected to the impingement cavity.

9. The turbine blade of claim 1, and further comprising:
a trailing edge cooling supply channel positioned in the trailing edge region of the airfoil;
a row of exit cooling slots or holes on the trailing edge; and,
cooling air connecting means between the trailing edge cooling supply channel and the exit cooling slots or holes to discharge cooling air from the supply channel to the slots or holes.

10. The turbine blade of claim 1, and further comprising:
the five channels in the 5-pass serpentine flow circuit each extend between the pressure side wall and the suction side wall of the airfoil.

11. The turbine blade of claim 1, and further comprising:
the last leg of the 5-pass serpentine flow cooling circuit includes a row of film cooling holes one the pressure side or the suction side wall to discharge film cooling air just upstream of the trailing edge region of the airfoil.

12. The turbine blade of claim 6, and further comprising:
the last leg of the 5-pass serpentine flow cooling circuit includes a row of film cooling holes one the pressure side wall to discharge film cooling air just upstream of the trailing edge region of the airfoil.

13. A turbine blade for a gas turbine engine comprising:
a leading edge region and a trailing edge region extending between a mid-chord region of an airfoil;
a five-pass serpentine flow cooling circuit to cool the mid-chord region of the airfoil;
the five-pass serpentine flow cooling circuit includes a first leg located in the mid-chord region, a second leg located forward of the first leg, a third leg located forward of the second leg, a fifth leg located rearward of the first leg, and a fifth leg located rearward of the fourth leg; and,
the five legs of the serpentine flow cooling circuit being connected in series.

14. The turbine blade of claim 13, and further comprising:
the five legs extend from a platform region of the blade to a tip region of the blade.

15. The turbine blade of claim 13, and further comprising:
a crossover channel joins the third leg to the fourth leg and forms a tip cooling channel for a tip of the blade.

16. The turbine blade of claim 13, and further comprising:
a leading edge cooling circuit located in the leading edge region;
a trailing edge cooling circuit located in the trailing edge region; and,
the five pass serpentine flow circuit being a separate cooling circuit from the leading and trailing edge cooling circuits.

17. The turbine blade of claim 13, and further comprising:
the first leg of the five-pass serpentine circuit is positioned between the second leg and the fourth leg.

* * * * *